US006824196B2

(12) United States Patent
Neidlein

(10) Patent No.: US 6,824,196 B2
(45) Date of Patent: Nov. 30, 2004

(54) MOTOR VEHICLE HAVING AN OPENING CLOSEABLE BY A SWIVELLABLE COMPONENT

(75) Inventor: Harald Neidlein, Stuttgart (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/394,584

(22) Filed: Mar. 24, 2003

(65) Prior Publication Data

US 2003/0214148 A1 Nov. 20, 2003

(30) Foreign Application Priority Data

Mar. 23, 2002 (DE) ........................................ 102 13 131

(51) Int. Cl.$^{7}$ .................................................. B60J 5/00
(52) U.S. Cl. ....................... 296/146.11; 49/399; 16/235
(58) Field of Search ......................... 296/146.11, 146.8, 296/76; 49/399; 16/235

(56) References Cited

U.S. PATENT DOCUMENTS 4,535,503 A * 8/1985 Narita et al. .................. 296/76
4,908,908 A * 3/1990 Mitsuoka et al. ...... 296/146.11
4,982,476 A * 1/1991 Salice ......................... 16/237
5,095,582 A * 3/1992 Ohlsson ....................... 16/235
6,038,740 A * 3/2000 Hoger et al. .................. 16/235
6,058,564 A * 5/2000 Purcell et al. ................ 16/235
6,382,704 B1 * 5/2002 Nastasoiu ............. 296/146.11
6,698,821 B2 * 3/2004 Racz ..................... 296/146.11

* cited by examiner

*Primary Examiner*—Lori L. Coletta
(74) *Attorney, Agent, or Firm*—Crowell & Moring LLP

(57) ABSTRACT

A motor vehicle has an opening which can be closed by a swivellable component, particularly a tail gate, the component being mounted by at least one hinge on a vehicle body part and the hinge having a first hinge half fastened to the vehicle body part and a second hinge half fastened to the swivellable component. An adjusting device for aligning the swivellable component with respect to the adjoining vehicle body contour is provided. So that the aligning of the swivellable component can be carried out from the direction of the exterior side of the vehicle when the component is closed, the adjusting device is arranged on the exterior side on the end area of the second hinge half facing the swivellable component.

20 Claims, 3 Drawing Sheets

MOTOR VEHICLE HAVING AN OPENING CLOSEABLE BY A SWIVELLABLE COMPONENT

BACKGROUND AND SUMMARY OF THE INVENTION

This application claims the priority of German Patent Application DE 102 13 131.7, filed Mar. 23, 2003, the disclosure of which is expressly incorporated by reference herein.

The invention relates to a motor vehicle having an opening which can be closed by a swivellable component, particularly a tail gate, in that the component is mounted by way of at least one hinge on a vehicle body part, and the hinge has a first hinge half fastened to the vehicle body part and a second hinge half fastened to the component, wherein an adjusting device for aligning the swivellable component with respect to an adjoining vehicle body contour is provided on one of the hinge halves.

In the case of motor vehicles of the above-mentioned type, dimensional deviations can generally not be completely avoided when manufacturing the vehicle body as well as in the event of possibly required repairs. Although, these dimensional deviations are relatively few, they nevertheless have the result that the swivellable components, such as the tail gate, which close the vehicle body openings, have to be aligned laterally and in their height with respect to the adjoining contour of the vehicle body. Thus, during the alignment for achieving a height compensation, it is frequently necessary that washers are placed under at least one hinge half. However, because in these cases, the fastening screw usually has to be completely removed, this approach represents a cumbersome and time-consuming process.

From German Patent Document DE 29 37 166 A1, it is known to provide an adjusting device on the hinge half fastened to the stationary vehicle body part, which adjusting device permits an alignment of the swivellable component with respect to the adjoining vehicle body contour.

For this purpose, the first hinge half has a curvature which extends parallel to the hinge axis and whose curvature center is situated close to the exterior surface of the swivellable component. One correspondingly curved sliding block respectively rests against the convex and concave area of the curvature, by way of which sliding block, the hinge half is clamped by way of a fastening screw which penetrates the hinge half by way of longitudinal slots extending perpendicular to the hinge axis and penetrates the vehicle body part by way of enlarged passage bores. This adjusting device is operated from the vehicle interior, whereas the correct alignment of the swivellable component can be checked only from the exterior side of the vehicle.

It is an aspect of the invention to provide a motor vehicle where the aligning of the swivellable component can be achieved in a simple manner at low expenditures from the exterior side of the vehicle while the component is closed.

This aspect may be achieved by providing the adjusting device on an exterior side on an end area of the second hinge half facing the swivellable component. Additional characteristics advantageously further developing the invention are contained herein and in the dependent claims.

Principal advantages achieved by certain preferred embodiments of the invention are that, as a result of the exterior-side arrangement of the adjusting device at the end area of the second hinge half, an alignment flush with the vehicle body shell is ensured as well as a constant joint appearance from the exterior of the vehicle when the component is closed. As a result of the mounting of a fitted-on covering part, the adjusting devices are covered after the adjusting of the swivellable component has taken place. The adjusting device formed by an adjusting nut and a fastening element interacting with a nut has a simple and cost-effective construction, the adjusting nut being adjustable relative to the second hinge half by way of an auxiliary tool from the exterior side of the vehicle. It was found to be an advantageous construction to provide two adjusting devices, which are situated behind one another viewed in the longitudinal direction of the vehicle, on the second hinge half. The adjusting devices may be provided on a hinge arm for a tail gate or, in the case of a tail gate with a swivellable rear window, on the hinge arm for the swivellable rear window.

Other objects, advantages and novel features of the present invention will become apparent from the following detailed description of the invention when considered in conjunction with the accompanying drawings.

DETAILED DESCRIPTION OF THE DRAWINGS

Figure 1:
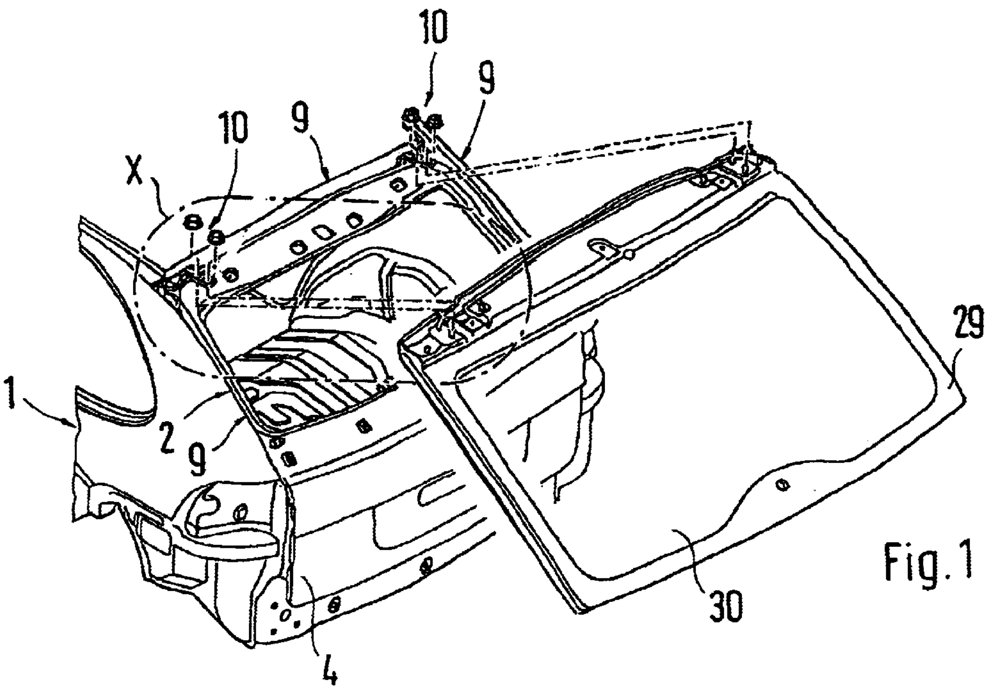
FIG. 1 shows a perspective view of the rear of a motor vehicle with a swivellable component formed by a tail gate.

FIG. 1 shows a reduced-scale view of the rear of a motor vehicle whose vehicle body 1 has an opening 2 which is closed off by a swivellable component. In the embodiment shown, the swivellable component is formed by a tail gate 4. As illustrated by the sectional view of FIG. 3, the tail gate 4 is mounted on the vehicle body 1 by way of at least one hinge 5 and is sealed off with respect to vehicle body 1 by a seal which is not shown in detail. The hinge 5 comprises basically a first hinge half 6 fastened to the stationary vehicle body 1 and a second hinge half 7 fastened to the tail gate 4. The second hinge half 7 is swivellable about a hinge axis 8, so that the tail gate 4 can be displaced from a closed position into a swivelled-up open position, which is not shown in detail, and vice versa.

For aligning the swivellable component with respect to the adjoining vehicle body contour 9 (upper roof frame, side parts, lower rear part), an adjusting device 10 is provided, by way of which the swivellable component can be adjusted in the longitudinal direction of the vehicle, the transverse direction of the vehicle and the vertical direction of the vehicle. The adjusting device 10 is provided on the exterior side on the end area 11 of the second hinge half 7 facing the swivellable component, and can be operated from the exterior side B of the vehicle.

Figure 2:
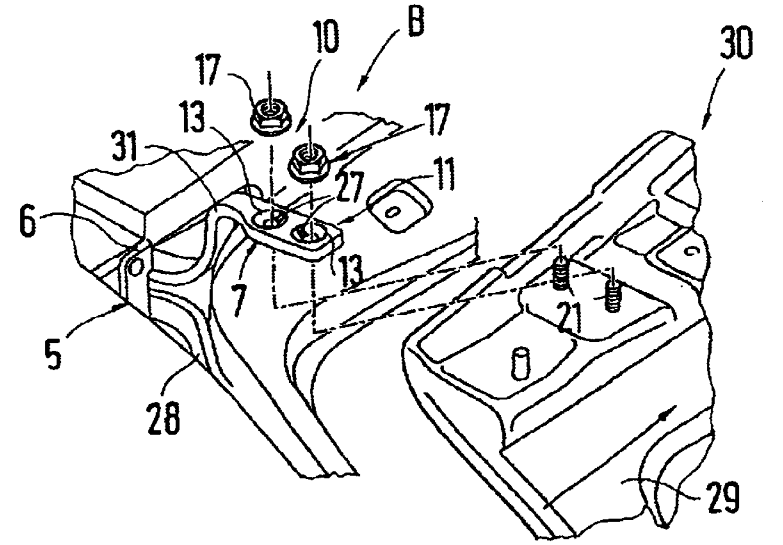
FIG. 2 shows an enlarged view of a detail X of FIG. 1.

According to FIG. 2, each adjusting device 10 comprises an adjusting nut 13 which can be screwed into a threaded bore 12 of the second hinge half 7 and which is adjustable in its height (direction C—C) with respect to the hinge half 7. Along the course of its entire vertical dimension, the adjusting nut 13 has an external thread 14 which, like the internal thread 15 of the threaded bore 12, is preferably constructed as a fine-pitch thread. In addition, a central passage opening 16 is arranged at the adjusting nut 13, for the guiding-through of a fastening element for the swivellable component, which fastening element interacts with a nut 17.

On the side facing a frame part 19 of the swivellable component, the adjusting nut 13 has a face-side projecting collar 20. Depending on the adjusted position of the adjusting nut 13, the collar 20 rests either on the frame part 19 or extends at a narrow distance from the latter. For adjusting the swivellable component in the longitudinal or lateral direction of the vehicle, the central passage opening 16 on the adjusting nut 13 has a clearly larger diameter than the outside diameter of the fastening element guided through.

According to FIG. 2, the fastening element for fastening the swivellable component is formed by a threaded bolt 21 mounted on the frame part 19. A head section 22 of the threaded bolt 21 is supported on the interior side of the member-shaped frame part 19, whereas the section provided with an external thread, while protruding over the frame part 19, projects upward on the outside. The nut 17 is screwed onto the free end of the threaded bolt 21 and is supported on a supporting surface 25 of the adjusting nut 13. By way of the nut 17, the adjusting nut 13 is tensioned against the frame part 19. In the embodiment shown, the supporting surface 25 forms the bottom surface of a pot-shaped recess 26 of the adjusting nut 13. As a result of this recess 26, the nut 17 does not project beyond the adjusting nut 13 in the upward direction or projects only slightly beyond it (low height of the adjusting device).

Figure 4:
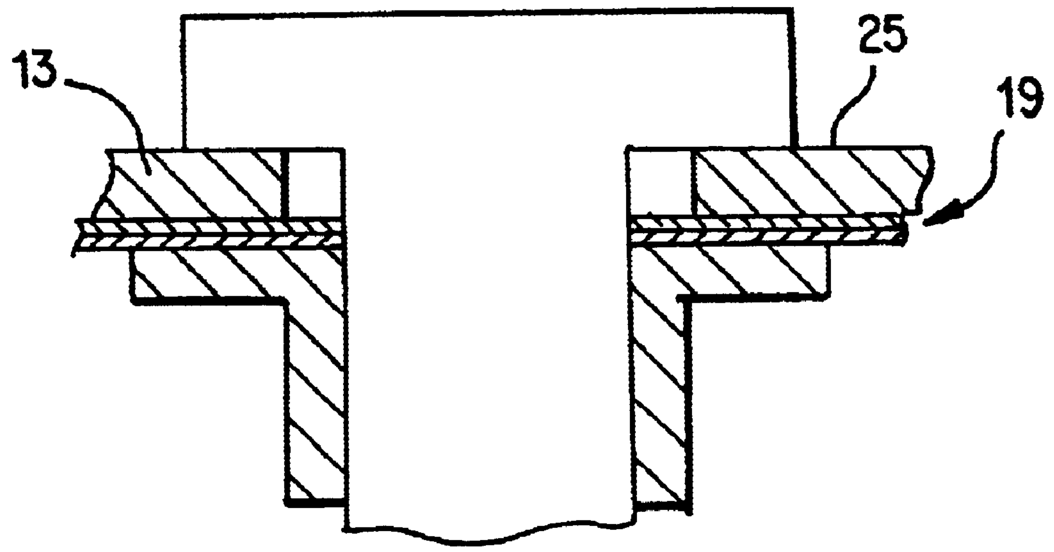
FIG. 4 shows a part sectional view through a modified configuration.

As shown in FIG. 4, the fastening element may also be formed by a cap screw screwed in from the outside, which cap screw is screwed into a nut mounted on the cavity-side at the frame part 19, the head of the cap screw resting on the supporting surface 25 of the adjusting nut 13.

Figure 3:
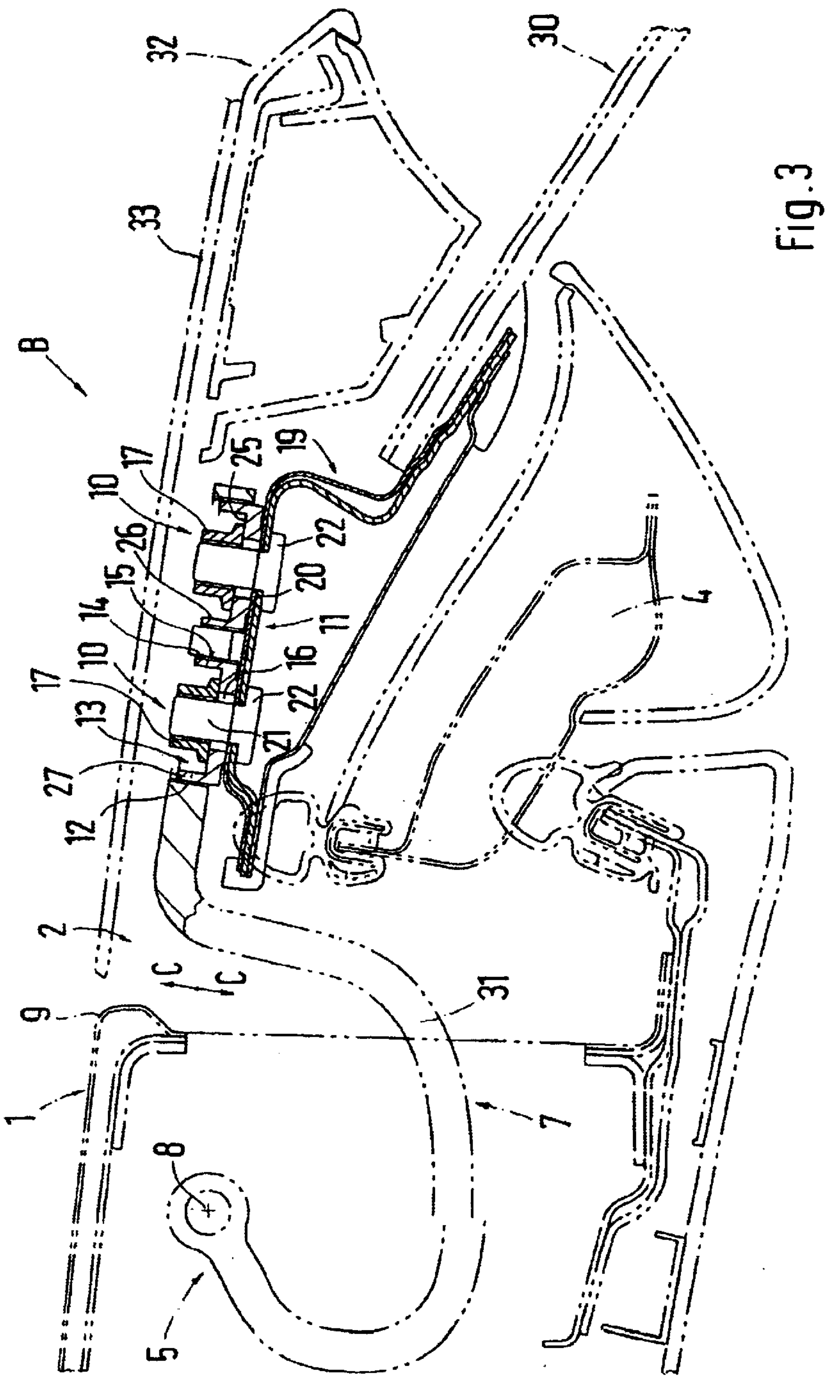
FIG. 3 shows a vertical sectional view in the longitudinal direction of the vehicle of the adjusting device for the tail gate.

Two adjusting devices 10 arranged behind one another viewed in the longitudinal direcction of the vehicle ara preferably arranged one each second hinge half (FIGS. 2 and 3).

For adjusting or rotating the adjusting nut 13 with respect to the second hinge half 7, an internal polygon (such as an internal hexagon or the like) is provided on the adjusting nut 13 on the side facing the exterior side of the vehicle, or grooves 27 for inserting an auxiliary tool, which are open in the upward and outward direction, are provided at the ring-shaped, upward projecting web of the adjusting nut. Preferably, two diametrically opposite grooves 27 are arranged on the ring-shaped web of the adjusting nut 13, into which grooves, the journal sections of the auxiliary tool, which is not shown in detail, can be introduced in order to rotate the adjusting nut 13 (not shown in detail).

The second hinge half 7 may be formed by a bent hinge arm 28 which is directly connected with a tail gate 4 provided with a swivellable rear window 30 (FIG. 2).

According to FIGS. 1–3, a tail gate 4 is provided which comprises a swivellable rear window 30 which can be operated separately from the tail gate 4 and is provided with a surrounding frame 29. In the case of this embodiment, the at least one adjusting device 10 is provided on the hinge arm 31 for the swivellable rear window 30.

By way of the adjusting nut 13, the swivellable component can be adjusted toward the outside as well as toward the inside, so that a transition to the adjoining vehicle body contour 9 can be achieved which is flush with the surface. A constant course of the joint between the swivellable component and the adjoining vehicle body contour 9 is ensured by the passage opening 16 on the adjusting nut 13. The adjusting devices 10 can be covered toward the outside by way of a fitted-on covering part 32, the covering part 32 being formed by a roof spoiler 33, a panel or the like.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Motor vehicle with an opening closeable by a swivellable component, wherein the component is mounted by way of at least one hinge on a vehicle body part and the hinge has a first hinge half fastened to the vehicle body part and a second hinge half fastened to the component, wherein an adjusting device for aligning the swivellable component with respect to an adjoining vehicle body contour is provided on one of the hinge halves, and wherein the adjusting device is provided on an exterior side on an end area of the second hinge half facing the swivellable component.

2. Motor vehicle according to claim 1, wherein the adjusting device is covered by a fitted-on covering part.

3. Motor vehicle according to claim 1, wherein the adjusting device comprises at least one adjusting nut which is screwable into a threaded bore of the second hinge half and which is adjustable in height with respect to the second hinge half, and wherein a central passage opening is arranged on the adjusting nut for guiding-through a screwable fastening element for the swivellable component, which said fastening element interacts with a nut.

4. Motor vehicle according to claim 3, wherein the adjusting nut has a face-side collar on a side facing a frame part of the swivellable component, depending on an adjusted position of the adjusting nut, the collar either resting on the frame part or extending at a narrow distance from the frame part.

5. Motor vehicle according to claim 3, wherein the central passage opening on the adjusting nut has a larger diameter than an outside diameter of the fastening element.

6. Motor vehicle according to claim 3, wherein the fastening element is formed by a threaded bolt mounted on the frame part and projecting toward the outside, the nut being screwed onto a free end of the threaded bolt, which said nut is supported on a supporting surface of the adjusting nut.

7. Motor vehicle according to claim 4, wherein a fastening element is formed by a threaded bolt mounted on the frame part and projecting toward the outside, the nut being screwed onto a free end of the threaded bolt, which said nut is supported on a supporting surface of the adjusting nut.

8. Motor vehicle according to claim 6, wherein the supporting surface forms a bottom surface of a pot-shaped recess of the adjusting nut.

9. Motor vehicle according to claim 3, wherein the fastening element is formed by a cap screw which is screwed in from the outside and which is screwed into a nut provided in a frame part, a head of the cap screw being supported on the supporting surface of the adjusting nut.

10. Motor vehicle according to claim 4, wherein a fastening element is formed by a cap screw which is screwed in from the outside and which is screwed into a nut provided in a frame part, a head of the cap screw being supported on the supporting surface of the adjusting nut.

11. Motor vehicle according to claim 1, wherein two adjusting devices, which, viewed in a longitudinal direction of the vehicle, are arranged behind one another, are provided on the second hinge half.

12. Motor vehicle according to claim 2, wherein two adjusting devices, which, viewed in a longitudinal direction of the vehicle, are arranged behind one another, are provided on the second hinge half.

13. Motor vehicle according to claim 3, wherein two adjusting devices, which, viewed in a longitudinal direction of the vehicle, are arranged behind one another, are provided on the second hinge half.

14. Motor vehicle according to claim 1, wherein the swivellable component is formed by a tail gate which comprises a rear window which can be operated separately from the tail gate and is provided with a frame, and wherein the at least one adjusting device is provided on a hinge arm for the swivellable rear window.

15. Motor vehicle according to claim 2, wherein the swivellable component is formed by a tail gate which comprises a rear window which can be operated separately from the tail gate and is provided with a frame, and wherein the at least one adjusting device is provided on a hinge arm for the swivellable rear window.

16. Motor vehicle according to claim 3, wherein the swivellable component is formed by a tail gate which comprises a rear window which can be operated separately from the tail gate and is provided with a frame, and wherein the at least one adjusting device is provided on a hinge arm for the swivellable rear window.

17. Motor vehicle according to claim 2, wherein the fitted-on covering part is formed by a panel and a roof spoiler.

18. Motor vehicle according to claim 3, wherein an internal thread of a threaded bore of the second hinge half and an external thread of the adjusting nut are constructed as fine-pitch threads.

19. Motor vehicle according to claim 3, wherein, on a side facing an exterior side of the vehicle, the adjusting nut has an internal polygon or grooves for inserting an auxiliary tool for rotating the adjusting nut.

20. A swivellable component assembly for closing an opening of a motor vehicle, comprising:

a swivellable component which operatively closes said opening, at least one hinge on a vehicle body part, the component being mounted by the hinge on the body part, the hinge having a first hinge half fastened to the body part and a second hinge half fastened to the component, and an adjusting device for aligning the component in relation to a vehicle contour, the adjusting device being arranged on an exterior side of the second hinge half at an end area facing the swivellable component.

* * * * *